United States Patent [19]

Baker

[11] Patent Number: 4,570,037

[45] Date of Patent: Feb. 11, 1986

[54] FAULT DETECTION IN A TELEPHONE CABLE PRESSURE MONITORING SYSTEM

[76] Inventor: Jerry L. Baker, 4359 Victor Ave., Cincinnati, Ohio 45242

[21] Appl. No.: 593,606

[22] Filed: Mar. 26, 1984

[51] Int. Cl.$^4$ .............................................. H04B 3/46
[52] U.S. Cl. .............................. 179/175; 179/175.3 F; 174/11 R
[58] Field of Search .................. 179/175.3 F, 175.1 R, 179/175, 175.3 R; 324/71.1, 541, 544; 340/626; 73/52, 40.5 R; 364/558; 174/11 R

[56] References Cited

U.S. PATENT DOCUMENTS

| | | | |
|---|---|---|---|
| 2,307,896 | 1/1943 | Neiswinter et al. | 179/175.3 |
| 3,105,882 | 10/1963 | Meyer | 179/175.3 |
| 3,105,883 | 10/1963 | Higson | 179/175.3 |
| 3,360,617 | 12/1967 | Munson | 179/175.3 |
| 3,444,336 | 5/1969 | Holt et al. | 179/175.3 F |
| 3,944,914 | 3/1976 | Simmonds | 324/51 |
| 4,025,736 | 5/1977 | Chlupsa | 179/175.3 F |
| 4,193,054 | 3/1980 | Reis | 73/861.53 |

*Primary Examiner*—Stafford D. Schreyer
*Attorney, Agent, or Firm*—Wood, Herron & Evans

[57] ABSTRACT

A system for detecting the source of a faulty pressure reading in a telephone cable pressure monitoring system is provided. The system interrupts a phone line circuit midstream and provides a test system thereat capable of remotely and concurrently testing both sides of the phone line including a pressure responsive variable resistance at one end and a sensing system at the other end of the line.

20 Claims, 1 Drawing Figure

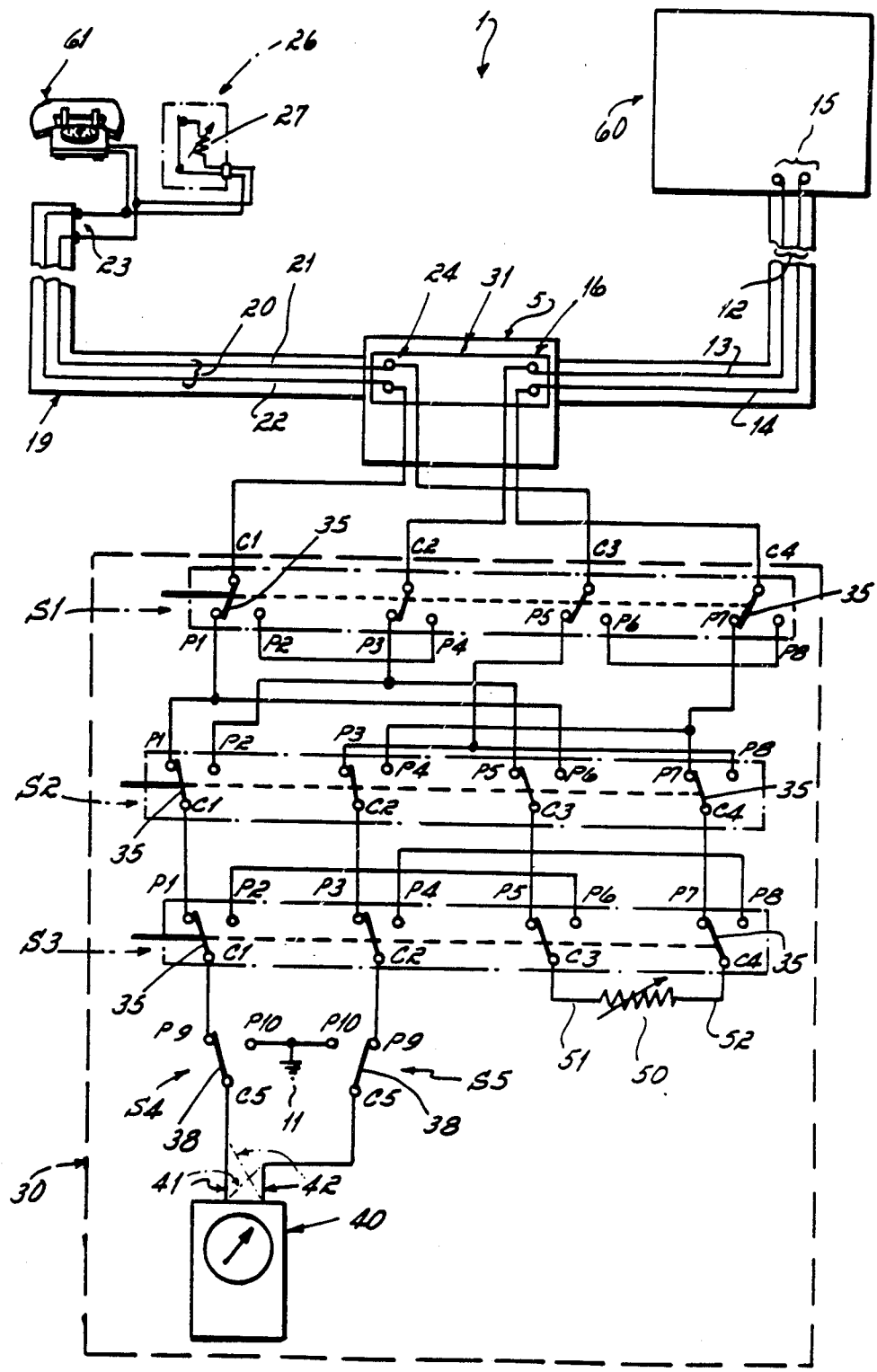

FAULT DETECTION IN A TELEPHONE CABLE PRESSURE MONITORING SYSTEM

This invention relates to a system to aid in determining the source of a faulty pressure reading in a telephone cable pressure monitoring system.

Many communications cables or the like, especially those currently employed by telephone companies, include a plurality of conductors housed within a protective air-tight sheathing. Such cables are maintained in a pressurized atmosphere by introducing compressed air, for example, at convenient locations along the cable. The pressure acts to prevent atmospheric air or water from seeping into the cable thereby potentially damaging the conductors housed therein. Instead, whenever a break or a leak in the cable sheathing occurs, pressurized air is forced out of the leak.

With the advent of these pressurized cables, it has become necessary to monitor the pressure at various points along the cable so that leaks can be detected and repaired before the pressure drops to too low a level, to prevent environmental exposure of the wires. Responding to that need, systems have been developed to monitor the pressure in the cable at various points. Typically, these systems include a pressure bellows transducer, for example, a resistance which varies proportionally to the pressure of the cable at that point, which connects a pressure-varying resistance across a predetermined two-conductor telephone line and a monitor which senses the transducer resistance to signal the existence of a faulty pressure condition in the cable. Typically, the monitor is in the form of automatic or computerized equipment which monitors the telephone line, particularly the pressure transducer resistance, from some remote sensing station whereat the monitoring equipment is located.

By way of background, a typical telephone system in which said monitoring technique is used includes a first telephone line housed in a pressurized cable which provides an electrical link between a local main distribution frame (mdf) and a user station such as a telephone. The line typically consists of a ring conductor and a tip conductor. The pressure bellows is situated at or near the user end of the line, for example. A second telephone line, also having ring and tip conductors, connects the mdf in a local central office, for example, and hence the first telephone line, to a switching station at a remote location, often many miles away. It is at that remote location that the previously discussed monitoring will actually take place. Those lines are usually one of a plurality of lines in a given communications cable.

At the remote location a computer or the like will periodically monitor the resistance on the telephone line by measuring the resistance as seen by the computer from ring conductor to tip conductor. That resistance is then translated to a corresponding pressure. Should the resistance drop to a point that indicates an unacceptably low pressure level, an alarm is usually set off to alert the repair personnel to a failure, or potential failure, in the system. Unfortunately, the computer will occasionally obtain a reading that is not indicative of the actual pressure at the transducer's location. When that occurs, it becomes necessary for the phone company to send out its crew of repair people to locate and repair the source of the faulty reading.

Typically, a repair person will go to the manhole or overhead line holding the transducer and attempt first to replace that transducer and wait for the remote computer to again test the line. The repair person must then contact someone at the remote location to find out whether or not the reading correlates with the pressure reading that the repairman manually observed at the transducer location. Often enough, it is not the transducer which has failed, but rather, some fault with the monitoring equipment or the ring or tip conductor in the telephone lines—either those in the pressurized cable between a user and the mdf, or those connecting the mdf and the remote testing location. When transducer replacement fails to solve the problem, the repairman must then start checking the lines on either side of the mdf to find a potential fault or short in that line. That means the repair person must travel along the telephone lines, climb poles, set up and enter manholes, etc., and test both ring and tip conductors at several locations until the problem is found. Known methods of finding faults are well known and need not be repeated here, except to note that they traditionally involve an extra person referred to as a "test desk" operator and, more importantly, take an experienced repairman an average of two or three hours to perform. Hence, standard methods employed to locate and repair an extraneous condition which produces a false pressure alarm involve a large input of man hours and expose repair persons to greater hazards. Of course, some lines are several miles long, in which the case it could take several days to locate and repair the cause of a fault.

Accordingly, the objective of the present invention has been to provide a system which can aid in determining the source of the faulty pressure reading.

A further objective of the present invention has been to provide a system which can aid in determining the source of a faulty pressure reading from a predetermined location, such as a central office.

Yet another objective of the present invention has been to provide a system to aid in determining the cause of a faulty pressure reading which can remotely and concurrently test the telephone lines on either side of the mdf, the monitoring system, and the pressure transducer.

An even further objective of the present invention has been to provide a system which can aid in determining the source of a faulty pressure reading in a very short period of time.

These objectives of the invention are obtained by providing a system in which all testing to locate the source of a fault is done from the mdf or other convenient location whereby a phone line can be interrupted midstream to form two phone lines, one on either side of a tester. In conjunction with a typical telephone system which includes (a) a first telephone line including a first ring conductor and a first tip conductor, wherein the line has a sensing end in communication with a remote sensing station and a test end; (b) a second telephone line including a second ring conductor and a second tip conductor, wherein the second line has a sensor end and a test end; (c) at least a portion of the second line including the sensor end is housed within a pressurized conduit; and (d) at the sensor end is a pressure responsive variable resistance shunting the ring and tip conductors of the second line to provide a large resistance proportional to the pressure in the pressurized conduit; the improvement wherein a tester is provided which is in electrical contact with the ring and tip conductors at the test ends of both phone lines for remotely and concurrently testing both of the lines and the pressure responsive variable resistance. The tester includes a variable test resistor, a volt/ohmmeter having two leads, and a first switch for shunting the first ring and first tip conductors with the test resistor and shunting the second ring and second tip conductor with the meter leads when the first switch is in a first position and for shunting the first ring and first tip conductors with the meter leads when the switch is in a second position. Preferably, in the above system, the variable test resistor shunts the second ring and second tip conductors when the first switch is in the second position. The tester also includes a second switch for selectively, electrically connecting one or both of the meter leads to ground.

In a preferred embodiment, the tester also includes a third and a fourth switch. The former selectively, electrically joins the first and second phone lines should it be necessary to re-establish that electrical path by shorting the first and second ring conductors to each other and shorting the first and second tip conductors to each other. The latter selectively, electrically connects the variable test resistor to the leads whereby the meter may be calibrated.

The single FIGURE, is a schematic representation of the system of the present invention.

GENERAL DESCRIPTION OF SYSTEM

To facilitate an understanding of the invention, a conventional telephone system and pressure responsive transducer is described. Specifically, the conventional telephone system includes a first pair of telephone wires 12 having a ring conductor 13 and a tip conductor 14 provide an electrical connection between a remote sensing station 60 and a main distribution frame (mdf) 5. Similarly, a second pair of telephone wires 20 having a ring conductor 21 and tip conductor 22 provide an electrical connection between the MDF 5 and a standard telephone set 61.

During normal operation of a telephone system, a connector block (not shown) is employed to provide electrical paths between ring conductors 13 and 21 and between tip conductors 14 and 22. Thus, if a user were to use telephone set 61, it would be connected to remote sensing station 60.

Remote station 60 routes the call as appropriate but also includes equipment designed to monitor phone line 12 (and, hence, phone line 20). Typically, a computer is employed and can include monitoring equipment such as is disclosed in U.S. Pat. No. 3,360,617, which is incorporated by reference herein.

One of the variables monitored from the remote station 60 is the resistance looking into the sensing end 15 of line 12. Impressed across line 20 at its sensor end 23 is a pressure responsive variable resistor 27 which is typically between 100K–3.8M ohms. Resistor 27 is part of pressure bellows transducer 26 which monitors the pressure within pressurized conduit 19 at sensor end 23 of line 20 and varies the resistance of resistor 27 in accordance therewith. One such transducer is disclosed in U.S. Pat. No. 3,283,283, which is incorporated herein by reference. Typically, line 20 is housed almost completely within pressurized conduit or cable 19 which is ideally maintained at a pressure of 9.5 psi corresponding to a 3.8M ohm resistance of resistor 27. When the resistance value of resistor 27 falls below a predetermined value representing a minimum accepted level of pressure for conduit 19, an alarm is set off at station 60.

Sometimes after an alarm is received at station 60 and the pressure is manually checked, it is found that the pressure in the conduit 19 is acceptable and that transducer 26 is operable. In that situation, it becomes necessary to test the lines for the cause of the false alarm.

In accordance with the present invention, the aforementioned connection block (not shown) at mdf 5 is removed and the tester 30 is electrically inserted in its place. Tester 30 may include mounting jack 31 for that purpose.

Tester 30 is shown electrically connected into the circuit between testing ends 16 and 24 of lines 12 and 20, respectively, but could be electrically connected into any phone line by splicing into any two ring and tip conductors. When in place, tester 30 can be electrically removed and a shorting circuit similar to the connection block can be inserted by bypass switch S1. When switch S1 is in the first position shown in the FIGURE, the remaining parts of tester 30 are in electrical connection with lines 12 and 20 as will be discussed hereafter. In the second position (not shown) of switch S1, an electrical short is provided between ring conductors 13 and 21 and between tip conductors 14 and 22 to complete the phone circuit. Switch S1 is provided to enable the repair person to reconnect the phone line should an indication appear that the line is in use such as when a user lifts the handset of telephone 61 off hook. Normally, the repair person will keep switch S1 in the first position shown in the FIGURE or it may be eliminated altogether.

Tester 30 includes a meter 40 having contacts 41 and 42, and potentiometer or variable resistance 50 having contacts 51 and 52. Meter 40 is preferably a volt-ohmmeter capable of being switched to perform either function. Specifically, meter 40 is preferably a Model KS-8455 meter available from Simpson Electric Company, Elgin, Ill., or the like, which is typically employed by repair persons on location, such as at sensor end 19, and meets the necessary criteria established by the phone company for proper testing of phone lines without unduly interfering with operation of the phone system. As will be appreciated by those skilled in the art, the meter face is typically calibrated in points to reflect certain pressure/resistance readings.

Variable resistance 50 could be a potentiometer, or a switch resistor group, or the like preferably having a range of approximately 100K–3.8M ohms. The potentiometer 50 is calibrated such that a knob or switch (not shown) on tester 30 indicates what pressure the particular setting of potentiometer 50 corresponds to.

To calibrate meter 40, tester 30 is preferably provided with switch S3. In the first position shown in the FIGURE, switch 63 connects meter 40 and potentiometer 50 into the circuits of lines 12 and 20 as will be discussed. In the second position (not shown), switch S3 electrically connects contacts 41 and 42 to contact 51 and 52, respectively, so that meter 40 can be calibrated to provide a reading corresponding to the known setting of potentiometer 50. As with switch S1, switch S3 could be eliminated and calibration accomplished in some other way.

To provide a complete testing system, the system of the present invention includes switch S2 which permits the repair person to selectively, electrically connect meter contacts 41 and 42 to the ring and tip conductors of one phone line and potentiometer leads 51 and 52 to the other line's conductors, or vice versa. In the first position of switch S2 shown in the FIGURE, meter leads 41 and 42 are electrically connected to tip and ring conductors 22 and 21, respectively, while potentiometer contacts 51 and 52 are electrically connected to ring and tip conductors 13 and 14, respectively. In the second position (not shown) of switch S2, meter contacts 41 and 42 are in electrical contact with ring and tip conductors 13 and 14, respectively, while potentiometer contacts 51 and 52 are now in contact with tip and ring conductors 22 and 21, respectively.

By virtue of switch S2, the repair person may monitor from the mdf 5 all parts of the system including sensing end 15 and sensor end 23.

To permit testing of individual lines, tester 30 is provided with switches S4 and S5. In their first position shown in the FIGURE, they permit meter contacts 41 and 42 to electrically engage the remaining circuitry as discussed above. In a second position (not shown) of either switch S4 and switch S5, or both, the respective meter contact is switched to ground 11 which is obtained from the mdf 5 itself. When both switch S4 and switch S5 are in the second position (not shown), meter 30 can be zeroed. When only one switch (S4 or S5) is in the second position, either the ring or tip conductor of the line being tested is electrically connected to a meter contact. That conductor can then be tested for shorts to ground or other defects in that conductor alone.

DETAILED DESCRIPTION OF TESTER 30

Switches S1, S2 and S3 are FPDT switches, each having four mechanically interconnected wiper arms 35, four wiper contacts C1, C2, C3, and C4, and eight output poles or contacts P1, P2, P3, P4, P5, P6, P7 or P8. In the first position of wiper arms 35 shown in FIG. 1, the following pairs of electrical connections are made within each switch by wiper arms 35: C1 to P1; C2 to P3; C3 to P5; C4 to P7. In the second position (not shown) of wiper arms 35, the following different pairs of electrical connections are made within each switch by wiper arms 35: C1 to P2; C2 to P4; C3 to P6; C4 to P8.

Switches S4 and S5 are SPDT switches each having a single wiper arm 38, one wiper contact C5 and two output poles or contacts P9, P10. In the first position of wiper arm 38, as shown in FIG. 1, electrical connection is made between C5 and P9 within each of switches S4 and S5 while in the second position (not shown) of wiper arm 38, electrical connection is made between C5 and P10 in each switch.

The following list shows the preferred electrical connection between the various contacts of all of the switches in order to utilize test circuit 30 in the system of the present invention. As an example, "P1,S1-P1,S2-P6,S2" means that contact P1 of switch S1 is in electrical contact with contact P1 of switch S2 and contact P6 of switch S2. Of course, that also means that contacts P1 and P6 of Switch S2 are also in electrical contact.

C1,S1-22
C2,S2-13
C3,S1-21
C4,S1-14
P1,S1-P1,S2-P6,S2
P7,S1-P4,S2-P7,S2
P3,S1-P2,S2-P5,S2
P4,S1-P2,S1
P5,S1-P3,S2-P8,S2
P6,S1-P8,S1
P7,S1-P4,S2-P7,S2
P8,S1-P6,S1
C1,S2-P1,S3
C2,S2-P3,S3
C3,S2-P5,S3
C4,S2-P7,S3
P1,S2-P6,S2-P1,S1
P2,S2-P5,S2-P3,S1
P3,S2-P8,S2-P5,S1
P4,S2-P7,S2-P7,S1
P5,S2-P2,S2-P3,S1
P6,S2-P1,S2-P1,S1
P7,S2-P4,S2-P7,S1
P8,S2-P3,S2-P5,S1
C1,S3-P9,S4
C2,S3-P9,S5
C3,S3-51
C4,S3-52
P1,S3-C1,S2
P2,S3-P6,S3
P3,S2-C2,S2
P4,S3-P8,S3
P5,S3-C3,S2
P6,S3-P2,S3
P7,S3-C4,S2
P8,S3-P4,S3
C5,S4-41
P9,S4-C1,S3
P10,S4-11
C5,S5-42
P9,S5-C2,S3
P10,S5-11

OPERATION OF THE SYSTEM

During operation with tester 30, switches S1, S3, S4 and S5 are normally in the first position as shown in the FIGURE. When switch S2 is in the first position shown in the FIGURE, sensing station 60 will be "seeing" potentiometer 50. Thus, the computer at 60 is tested by determining whether the resistance it reads corresponds to the setting of potentiometer 50. Concurrently, meter 40 is across line 20 and can thus test conductors 21 and 22 and transducer 26.

To test transducer 26, the meter 40 is set as an ohmmeter and merely reads the resistance in line 20. If the resistance read on meter 40 does not correspond with the pressure which had been previously tested manually at sensor end 23, then transducer 26 may be faulty. To insure that the problem is wholly within transducer 26, it is also necessary to test each conductor in line 20. First, the capacitance in line 20 is tested. That test is performed in the ohmmeter mode by switching the polarity of leads 41 and 42 back and forth (the KS-8455 meter includes a switch to internally make the polarization reversal) and monitoring the "ballistic kick" appearing as a meter needle deflection. In the FIGURE, lead 42 corresponds to a first meter lead and lead 41 corresponds to a second meter lead. Meter leads 41 and 42, as shown in solid line, are connected to define a first polarity state whereas they are shown connected in dotted line to define a second polarity state. If either conductor is faulty, as opposed to transducer 26, the ballistic kick will not appear in the manner typically seen with a properly operating telephone line. For example, if a conductor is damaged, the kick will appear either too slow or too fast to the trained operator. Further, a near short may occur wherein the line has not failed completely but it is about to. In that case, the kick may appear almost nonexistent. If the kick appears proper, the incorrect resistance reading likely indicates a transducer error.

If line 20 appears faulty, switch S4 or S5 can be alternately switched to their second position so that only one conductor of the line is tested at a time to find which conductor has the problems. Meter 40 also can monitor the voltages on line 20 to assure that appropriate voltages are present for particular status modes, such as off-hook, on-hook, etc., of line 20.

While monitoring line 20, should the meter needle peg or deflect sharply, that indicates the subscriber is attempting to use the line, such as by picking up the receiver in telephone set 61. In that situation, the repair person simply moves switch S1 to its second position to establish the electrical circuit between lines 12 and 20. After a sufficient waiting time, switch S1 is returned to its first position and testing continues.

When switch S2 is moved to its second position, the meter is now monitoring line 12. In this mode, meter 40 deflects whenever the computer at station 60 is testing the line. Hence, the repair person can determine, in addition to the previous potentiometer test, whether line 12 is in working condition. Also, by using switches S4 and S5, and the abilities of the preferred KS volt-ohmmeter, conductors 21 and 22 may be tested as was done for line 20.

I claim:

1. A system to aid in determining a source of a faulty pressure reading in a pressurized telephone cable which includes:
   a first telephone line including a first ring conductor and a first tip conductor, said line having a sensing end in communication with a remote sensing station and a first test end;
   a second telephone line including a second ring conductor and a second tip conductor, said second line having a sensor end and a second test end, at least a portion of said second line including said sensor end being housed within a pressurized conduit;
   pressure responsive variable resistance means shunting said second ring and tip conductors at said sensor end for providing a resistance across said second line which, in normal operation, is proportional to the pressure in said pressurized conduit near said sensor end;
   the improvement comprising:
   test means in electrical contact with said ring and tip conductors at said test ends of said lines for remotely and concurrently testing both of said lines and said pressure responsive variable resistance means, said test means including a variable test resistor, an ohmmeter to measure resistance and a first switch means for shunting said first ring and first tip conductors with said test resistor and shunting said second ring and second tip conductors with said meter when said first switch means is in a first position, and for shunting said first ring and first tip conductors with said meter when said first switch means is in a second position.

2. The system of claim 1, said variable test resistor shunting said second ring and second tip conductors when said first switch means is in said second position.

3. The system of claim 1, wherein said test means further includes second switch means for selectively, electrically joining said first and second phone lines by shorting said first and second ring conductors to each other and shorting said first and second tip conductors to each other.

4. The system of claim 1, wherein said test means further includes third switch means for selectively, electrically connecting said variable test resistance to said meter whereby said meter may be calibrated.

5. The system of claim 1, wherein said test means further includes fourth switch means for selectively, electrically connecting at least one side of said meter to ground.

6. The system of claim 1, said meter having first and second meter leads;
   said first meter lead and said second meter lead being coupled to said first ring conductor and said first tip conductor, respectively, when said first switch means is in said first position and to said second tip conductor and said second ring conductor, respectively, when said first switch means is in said second position, to define a first polarity state and said first meter lead and said second meter lead being coupled to said first tip conductor and said first ring conductor, respectively, when said first switch means is in said first position and to said second ring conductor and said second tip conductor, respectively, when said first switch means is in said second position, to define a second polarity state.

7. The system of claim 1, wherein said ohmmeter includes means for selectively functioning as a volt meter to measure a voltage on at least one of said conductors.

8. The system of claim 1, wherein said test means includes connector means for removably connecting said test means into electrical contact with said ring and tip conductors at said test ends of said lines.

9. The system of claim 2, wherein said test means includes connector means for removably connecting said test means into electrical contact with said ring and tip conductors at said test ends of said lines.

10. The system of claim 9, wherein said test means further includes second switch means for selectively, electrically joining said first and second phone lines by shorting said first and second ring conductors to each other and shorting said first and second tip conductors to each other.

11. The system of claim 10, wherein said test means further includes third switch means for selectively, electrically connecting said variable test resistance to said meter, whereby said meter may be calibrated.

12. The system of claim 11, said meter having first and second meter leads;
   said first meter lead and said second meter lead being coupled to said first ring conductor and said first tip conductor, respectively, when said first switch means is in said first position and to said second tip conductor and said second ring conductor, respectively, when said first switch means is in said second position, to define a first polarity state and said first meter lead and said second meter lead being coupled to said first tip conductor and said first ring conductor, respectively, when said first switch means is in said first position and to said second ring conductor and said second tip conductor, respectively, when said first switch means is in said second position, to define a second polarity state.

13. The system of claim 12, wherein said test means further includes fourth switch means for selectively, electrically connecting at least one of said ohmmeter leads to ground.

14. The system of claim 13 wherein said ohmmeter includes means for selectively functioning as a volt meter to measure a voltage on at least one of said conductors.

15. A method to determine a source of a faulty pressure reading in pressurized telephone lines having a first telephone line including a first ring conductor and first tip conductor with a sensing end in communication with a remote sensing station and a first test end, a second telephone line including a second ring conductor and a second tip conductor with a sensor end and a second test end, and pressure responsive variable resistance means shunting said second ring and tip conductors at said sensor end for providing a resistance across said second line which, in normal operation, is proportional to the pressure in said pressurized conduit near said sensor end, the method comprising:

establishing electrical contact between a test means and said ring and top conductors at said test ends of said lines, said test means including a variable test resistor, a volt-ohmmeter having first and second leads and including means for selectively adapting said meter to be either a volt meter to measure a voltage on at least one of said conductors or an ohmmeter to measure resistance, and a first switch means for shunting said first ring and first tip conductors with said test resistor and shunting said second ring and second tip conductors with said first and second meter leads when said first switch means is in a first position, and for shunting said first ring and first tip conductors with said first and second meter leads and said variable test resistor shunting said second ring and second tip conductors when said first switch means is in said second position;

moving said first switch means into said first position, and performing one or more of:
(a) selectively adapting said meter to be an ohmmeter and measuring a resistance across said test end of said second conductors and concurrently providing a test resistance across said test end of said first conductors;
(b) selectively adapting said meter to be a volt meter and measuring a voltage across said second conductors;

moving said first switch means into said second position and performing one or more of:
(a) selectively adapting said meter to be an ohmmeter and measuring a resistance across said test end of said first conductors and concurrently providing a test resistance across said test end of said second conductors;
(b) selectively adapting said meter to be a volt meter and measuring a voltage across said first conductors.

16. The method of claim 15, wherein said first meter lead and said second meter lead are couplable to said first ring conductor and said first tip conductor, respectively, when said first switch means is in said first position and to said second tip conductor and said second ring conductor, respectively, when said first switch means is in said second position, to define a first polarity state, and said first meter lead and said second meter lead are couplable to said first tip conductor and said first ring conductor, respectively, when said first switch means is in said first position and to said second ring conductor and said second tip conductor, respectively, when said first switch means is in said second position to define a second polarity state, the method further comprising alternating between said first and second polarity states to provide a ballistic kick when said first switch means is in said first position and said meter is adapted to be an ometer.

17. The method of claim 16, wherein the test means includes means for selectively, electrically connecting at least one of said meter leads to the ground, the method further including moving said first switch means to said first position connecting one lead of said meter to ground, the other said meter lead being ungrounded, and performing one or more of:
(i) selectively adapting said meter to be an ohmmeter and measuring a resistance to ground of said conductor connected to said ungrounded meter lead;
(ii) alternating between said polarity states twice to provide a ballistic kick to said conductor connected to said ungrounded meter lead; and
(iii) selectively adapting said meter to be a volt meter and measuring a voltage on said conductor connected to said ungrounded meter lead.

18. The method of claim 17, the method further comprising connecting the other of said meter leads to ground and performing one or more of said steps (i) to (iii).

19. The method of claim 16, wherein said test means includes means for selectively, electrically connecting at least one of said meter leads to ground, the method further including moving said first switch means to said second position, connecting one lead of said meter to ground, the other said meter lead being ungrounded, and performing one or more of:
(i) selectively adapting said meter to be an ohmmeter and measuring a resistance to ground of said conductor connected to said ungrounded meter lead;
(ii) alternating between said polarity states twice to provide a ballistic kick to said conductor connected to said ungrounded meter lead; and
(iii) selectively adapting said meter to be a volt meter and measuring a voltage on said connector connected to said ungrounded meter lead.

20. The method of claim 19, the method further comprising connecting the other of said meter leads to ground and performing one or more of said steps (i) to (iii).

* * * * *

UNITED STATES PATENT AND TRADEMARK OFFICE
CERTIFICATE OF CORRECTION

PATENT NO. : 4,570,037
DATED      : February 11, 1986
INVENTOR(S): Jerry L. Baker It is certified that error appears in the above-identified patent and that said Letters Patent is hereby corrected as shown below:

Col. 4, line 51, "63" should be --S3--.

Col. 5, line 57, "C2,S2-13" should be --C2,S1-13--.

Col. 9, line 15, "top" should be --tip--.

Col. 10, line 14, "ometer" should be --ohmmeter--.

Signed and Sealed this

Twenty-fourth Day of June 1986

[SEAL]

Attest:

DONALD J. QUIGG

Attesting Officer

Commissioner of Patents and Trademarks